United States Patent
Kubo et al.

(10) Patent No.: US 11,112,768 B2
(45) Date of Patent: Sep. 7, 2021

(54) NUMERICAL CONTROLLER AND MACHINE LEARNING DEVICE

(71) Applicant: FANUC CORPORATION, Yamanashi (JP)

(72) Inventors: Mamoru Kubo, Yamanashi (JP); Toshinori Matsukawa, Yamanashi (JP); Kouichi Murata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 370 days.

(21) Appl. No.: 15/839,251

(22) Filed: Dec. 12, 2017

(65) Prior Publication Data

US 2018/0164781 A1 Jun. 14, 2018

(30) Foreign Application Priority Data

Dec. 13, 2016 (JP) .............................. JP2016-241680

(51) Int. Cl.
*G05B 19/406* (2006.01)
*G06N 20/00* (2019.01)
(Continued)

(52) U.S. Cl.
CPC ....... *G05B 19/4083* (2013.01); *G05B 13/026* (2013.01); *G05B 13/0265* (2013.01);
(Continued)

(58) Field of Classification Search
CPC ................................ G06N 99/00; G06N 20/00
See application file for complete search history.

(56) References Cited

U.S. PATENT DOCUMENTS

| 7,539,549 B1* | 5/2009 | Discenzo | ............ F04D 15/0077 |
|---|---|---|---|
| | | | 324/765.01 |
| 2009/0164143 A1* | 6/2009 | Duckworth | ......... G01M 5/0025 |
| | | | 702/38 |

(Continued)

FOREIGN PATENT DOCUMENTS

| JP | H6-332528 A | 12/1994 |
|---|---|---|
| JP | 2003-280707 A | 10/2003 |

(Continued)

OTHER PUBLICATIONS

Chandola, V, A. Banerjee, and V. Kumar, "Anomaly detection: A survey", ACM Compu. Surv. 41, 3, article 15, Jul. 2009, 58 pages. (Year: 2009).*

(Continued)

*Primary Examiner* — Vincent Gonzales
(74) *Attorney, Agent, or Firm* — Hauptman Ham, LLP

(57) ABSTRACT

To provide a numerical controller and a machine learning device that predict an abnormality, based on machine learning with perception of temporal change in data. The numerical controller includes the machine learning device provided with a learning unit that conducts machine learning of trends in operation of a machine on occasions of occurrence of abnormalities in the machine, based on time-series data acquired by a data logger device and relating to the operation of the machine and abnormality information relating to the abnormalities which have occurred in the machine and a prediction unit that predicts an abnormality which will occur in the machine, based on results of the machine learning in the learning unit and time-series data acquired by the data logger device and relating to current operation of the machine.

6 Claims, 6 Drawing Sheets

CLUSTER OF SIMILAR FEATURE VECTORS
→ DUE TO GROUPING OF SIMILAR SITUATIONS, THERE IS POSSIBILITY THAT SAME ABNORMALITIES MAY OCCUR

(51) Int. Cl.
  *G06N 3/08* (2006.01)
  *G05B 19/408* (2006.01)
  *G05B 13/02* (2006.01)

(52) U.S. Cl.
  CPC ............ *G05B 19/406* (2013.01); *G06N 3/08* (2013.01); *G06N 20/00* (2019.01); *G05B 2219/33322* (2013.01); *G05B 2219/34477* (2013.01)

(56) References Cited

U.S. PATENT DOCUMENTS

| | | | |
|---|---|---|---|
| 2011/0162050 A1 | 6/2011 | Krajna et al. | |
| 2011/0276828 A1 | 11/2011 | Tamaki et al. | |
| 2012/0316835 A1 | 12/2012 | Maeda et al. | |
| 2014/0013125 A1* | 1/2014 | Lynar ................. | G06F 1/30 713/300 |
| 2016/0041548 A1 | 2/2016 | Chung et al. | |
| 2016/0077510 A1 | 3/2016 | Kim | |

FOREIGN PATENT DOCUMENTS

| | | |
|---|---|---|
| JP | 2007272545 A | 10/2007 |
| JP | 2011145846 A | 7/2011 |
| JP | 2013-11987 A | 1/2013 |
| JP | 2016062598 A | 4/2016 |
| JP | 2016-173782 A | 9/2016 |
| WO | 2010082322 A1 | 7/2010 |

OTHER PUBLICATIONS

J. Lee, M. Ghaffarti, and S. Elmeligy, "Self-maintenance and engineering immune systems: Towards smarter machines and manufacturing systems", Annual Reviews in Control 35 (2011), 111-22. (Year: 2011).*

Aghabozorgi, Saeed et al., "Time-series clustering—A decade review", Info. Sys. 53, 2015, pp. 16-38. (Year: 2015).*

Edwards, David J. and Silas Yisa, "Modelling the magnitude of plant downtime: a tool for improving plant operations management", Engineering, Construction and Architectural Managment, 2001, 8.3, pp. 225-232. (Year: 2001).*

Notice of Allowance in Japanese Application No. 2016-241680, dated Jul. 17, 2018, 6pp.

Office Action in DE Application No. 102017129227.6, dated Jun. 25, 2019, 8pp.

Office Action in CN Application No. 201711328509.9, dated May 20, 2019, 12pp.

* cited by examiner (i) APPROXIMATE POLYNOMIAL IS FOUND FOR ONE TYPE OF TIME-SERIES DATA $$y = \sum_{n=0}^{} w_n t^n$$

$\rightarrow$ CALCULATION $\rightarrow$ $(w_{00}, w_{01}, \ldots, w_{0n})$ MOTOR PRESSURE (ii) STEP (i) IS ITERATED FOR ALL DATA MOTOR PRESSURE $\rightarrow$ $(w_{00}, w_{01}, \ldots, w_{0n})$ MOTOR POSITION $\rightarrow$ $(w_{10}, w_{11}, \ldots, w_{1n})$ $\vdots$ MOTOR SPEED $\rightarrow$ $(w_{m0}, w_{m1}, \ldots, w_{mn})$

FIG. 3B

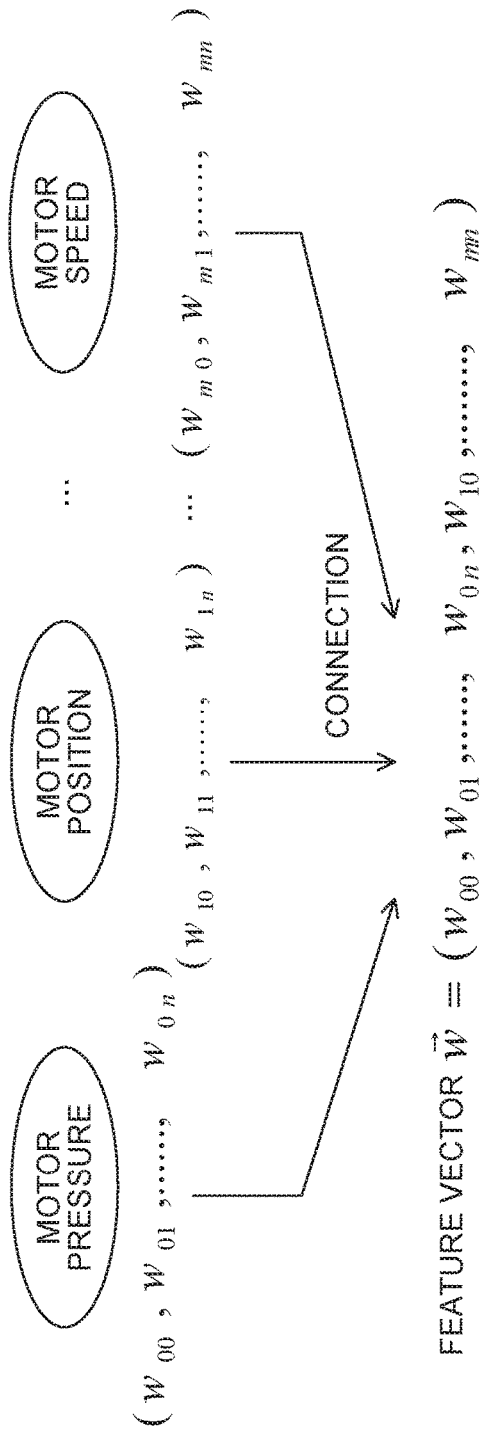

(iii) FEATURE VECTOR IS GENERATED BY CONNECTION OF ALL OF $w_n$ $(w_{00}, w_{01}, \ldots, w_{0n})$ $(w_{10}, w_{11}, \ldots, w_{1n})$ $\ldots$ $(w_{m0}, w_{m1}, \ldots, w_{mn})$ FEATURE VECTOR $\vec{w} = (w_{00}, w_{01}, \ldots, w_{0n}, w_{10}, \ldots, w_{mn})$ (iv) RELATIONSHIPS BETWEEN FEATURE VECTORS AND TYPES AND TIME OF ABNORMALITIES ARE STORED IN DATABASE

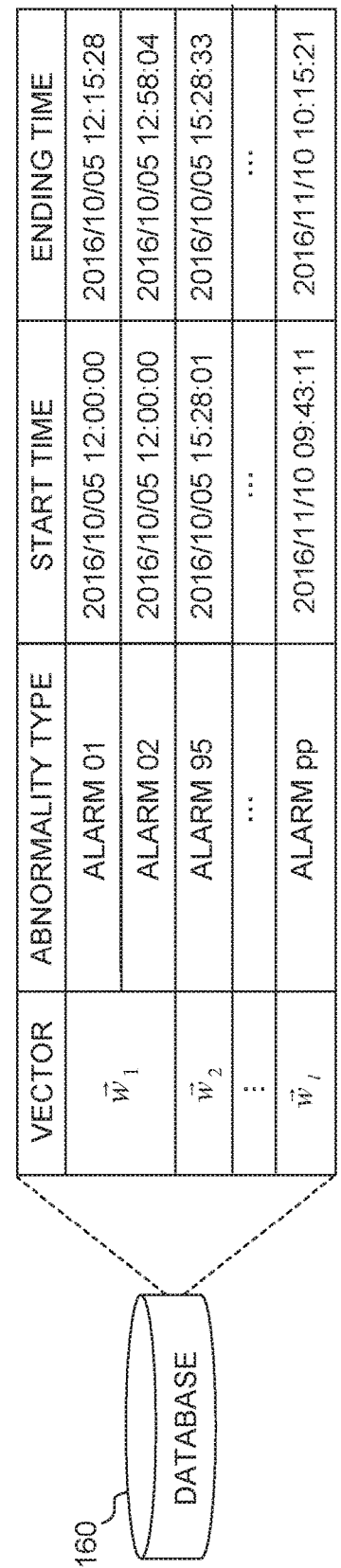

| VECTOR | ABNORMALITY TYPE | START TIME | ENDING TIME |
|---|---|---|---|
| $\vec{w}_1$ | ALARM 01 | 2016/10/05 12:00:00 | 2016/10/05 12:15:28 |
|  | ALARM 02 | 2016/10/05 12:00:00 | 2016/10/05 12:58:04 |
| $\vec{w}_2$ | ALARM 95 | 2016/10/05 15:28:01 | 2016/10/05 15:28:33 |
| $\vdots$ | $\vdots$ | $\vdots$ | $\vdots$ |
| $\vec{w}_l$ | ALARM pp | 2016/11/10 09:43:11 | 2016/11/10 10:15:21 |

CLUSTER OF SIMILAR FEATURE VECTORS
→ DUE TO GROUPING OF SIMILAR SITUATIONS, THERE IS POSSIBILITY THAT SAME ABNORMALITIES MAY OCCUR

IN ABOVE CASE, CURRENT FEATURE VECTOR IS MOST APPROXIMATE TO CLUSTER A

NUMERICAL CONTROLLER AND MACHINE LEARNING DEVICE

RELATED APPLICATIONS

The present application claims priority of Japanese Application Number 2016-241680 filed Dec. 13, 2016, the disclosure of which is hereby incorporated by reference herein in its entirety.

BACKGROUND OF THE INVENTION

1. Field of the Invention

The present invention relates to a numerical controller and a machine learning device and particularly relates to a numerical controller and a machine learning device that predict an abnormality, based on machine learning.

2. Description of the Related Art

FIG. 6 is a diagram that illustrates a data logger device. The data logger device periodically collects various data (mode, motor load, speed of revolution of a cooling fan, and the like) in a numerical controller and stores the data in a storage device. For the data logger device, types of the data to be collected, a period of collection, and the like can be set and the collected data can be displayed in forms of tables, graphs, or the like. Upon occurrence of an abnormality such as an alarm in the numerical controller, use of the data logger device makes it possible for a user to analyze the data collected by the data logger device and to thereby identify a cause of the abnormality. Thus the data logger device can be used to eliminate a cause of an abnormality having occurred in the numerical controller or the like and consequently contributes to an increase in an operating rate of a machine tool.

Methods of detecting an abnormality by analyzing data recorded with use of a data logger device principally include a method in which statistics such as a maximum value, a minimum value, and an average are calculated and in which the calculated statistics are compared with previous data and a method in which outliers or the like are inspected visually (based on experience and intuition). Though the data in a simple case can be manually inspected by a skilled person, it is difficult to manually inspect an abnormality related to a large amount of data and caused by complex factors. In case where an alarm on motor speed is given in an injection molding machine, for instance, an abnormality related directly to the motor speed may be suspected first of all, in general. Such an alarm, however, may be caused by clogging in a channel for pouring resin, depending on circumstances, as shown in a decision tree that is illustrated in FIG. 7 and that is used for cause estimation upon occurrence of an abnormality. Thus it is difficult even for a skilled person to elucidate such factors.

Therefore, techniques of automatically detecting an abnormality with use of a computer or the like have been developed as prior art techniques. For instance, Japanese Patent Application Laid-Open No. 2011-145846 discloses a technique in which an abnormality is detected with use of time-series behavior of coefficients in approximate expressions found by linear prediction (regression analysis) based on data acquired from sensors and the like. International Publication No. 2010/082322 discloses a technique in which a degree of deviation between normal data predicted by regression analysis and current data is found and in which an abnormality is detected based on ranking of data items that cause the degree of deviation to exceed a threshold.

Japanese Patent Application Laid-Open No. 2016-062598 discloses a technique in which patterns based on temporal changes in data in abnormal situations and current data are analyzed and in which an abnormality is predicted based on data similarities between the patterns. Japanese Patent Application Laid-Open No. 2007-272545 discloses a technique in which control results (coordinate values) in preceding work machining are compared with predicted values (predicted coordinate values) determined from current commands and in which an abnormality is announced if the values do not coincide.

In current methods of predicting an abnormality with use of machine learning, learning data is handled as a snapshot and a technique of perceiving temporal change in the data has not been established. In the prior art techniques, in which data is mainly inputted from sensors, techniques of abnormality detection with handling of data for manual operation and commands on mode switching, override, and the like in a numerical controller have not been established.

SUMMARY OF THE INVENTION

An object of the invention is to provide a numerical controller and a machine learning device that predict an abnormality, based on machine learning with perception of temporal change in data.

A machine learning device that is introduced into a numerical controller according to the invention resolves above problems by finding first approximate polynomials, upon occurrence of an abnormality, based on regression analysis of collected data for a given period immediately prior to the occurrence, classifying a feature vector generated based on coefficients in the found first approximate polynomials, by clustering, finding second approximate polynomials based on regression analysis of current collected data, determining which cluster a feature vector generated based on the found second approximate polynomials belongs to, producing ranking based on scoring of abnormalities having occurred in the cluster to which the feature vector belongs, and making notification in order of the ranking. A numerical controller according to the invention that controls a machine includes a data logger device that acquires information, relating to operation of the machine, as time-series data, and a machine learning device that conducts machine learning of trends in operation of the machine on occasions of occurrence of abnormalities in the machine, based on the time-series data acquired by the data logger device. The machine learning device includes a state observation unit that acquires the time-series data, acquired by the data logger device, as input data, an abnormality observation unit that acquires abnormality information relating to the abnormalities which occur in the machine, a learning unit that conducts the machine learning of the trends in the operation of the machine on the occasions of the occurrence of the abnormalities, based on the input data acquired by the state observation unit and the abnormality information acquired by the abnormality observation unit, and a database that stores results of the machine learning in the learning unit. The learning unit includes an analysis unit that finds approximate expressions for the time-series data included in the input data, that generates a feature vector based on the found approximate expressions, and that stores the generated feature vector, associated with the abnormality information, in the database, and a clustering unit that carries out clustering of the feature vector generated by the analysis unit and that stores results of the clustering in the database.

A numerical controller according to the invention that predicts an abnormality which will occur in a machine to be controlled includes a data logger device that acquires information, relating to operation of the machine, as time-series data, a machine learning device that predicts occurrence of the abnormality in the machine based on the time-series data acquired by the data logger device, and an abnormality prediction notification unit that makes notification of prediction results, given by the machine learning device, on the occurrence of the abnormality in the machine. The machine learning device includes a database that stores results of machine learning of trends in the operation of the machine on occasions of occurrence of abnormalities, a state observation unit that acquires the time-series data, acquired by the data logger device, as input data, and a prediction unit that predicts the occurrence of the abnormality in the machine based on the input data acquired by the state observation unit and the results of the machine learning that are stored in the database. In the database, feature vectors representing the trends in the operation of the machine on the occasions of the occurrence of the abnormalities in the machine and abnormality information relating to the abnormalities are stored in association with each other and results of clustering of the feature vectors are stored. The prediction unit includes a similar cluster determination unit that finds approximate expressions for the time-series data included in the input data, that generates a feature vector based on the found approximate expressions, and that determines which cluster stored in the database is an approximation to the generated feature vector, and an abnormality ranking determination unit that produces ranking information on abnormalities associated with feature vectors belonging to the cluster determined as the approximation to the feature vector by the similar cluster determination unit and that outputs the produced ranking information as prediction results on the occurrence of the abnormality in the machine.

A machine learning device according to the invention that conducts machine learning of trends in operation of a machine on occasions of occurrence of abnormalities in the machine, based on time-series data representing information relating to the operation of the machine and acquired by a data logger device provided in a numerical controller which controls the machine includes a state observation unit that acquires the time-series data, acquired by the data logger device, as input data, an abnormality observation unit that acquires abnormality information relating to the abnormalities which occur in the machine, a learning unit that conducts the machine learning of the trends in the operation of the machine on the occasions of the occurrence of the abnormalities, based on the input data acquired by the state observation unit and the abnormality information acquired by the abnormality observation unit, and a database that stores results of the machine learning in the learning unit. The learning unit includes an analysis unit that finds approximate expressions for the time-series data included in the input data, that generates a feature vector based on the found approximate expressions, and that stores the generated feature vector, associated with the abnormality information, in the database, and a clustering unit that carries out clustering of the feature vector generated by the analysis unit and that stores results of the clustering in the database.

A machine learning device according to the invention that predicts an abnormality which will occur in a machine controlled by a numerical controller including a data logger device, based on time-series data acquired by the data logger device and representing information relating to operation of the machine includes a database that stores results of machine learning of trends in the operation of the machine on occasions of occurrence of abnormalities, a state observation unit that acquires the time-series data, acquired by the data logger device, as input data, and a prediction unit that predicts occurrence of the abnormality in the machine based on the input data acquired by the state observation unit and the results of the machine learning that are stored in the database. In the database, feature vectors representing the trends in the operation of the machine on the occasions of the occurrence of the abnormalities in the machine and abnormality information relating to the abnormalities are stored in association with each other and results of clustering of the feature vectors are stored. The prediction unit includes a similar cluster determination unit that finds approximate expressions for the time-series data included in the input data, that generates a feature vector based on the found approximate expressions, and that determines which cluster stored in the database is an approximation to the generated feature vector, and an abnormality ranking determination unit that produces ranking information on abnormalities associated with feature vectors belonging to the cluster determined as the approximation to the feature vector by the similar cluster determination unit and that outputs the produced ranking information as prediction results on the occurrence of the abnormality in the machine.

According to the invention, in which the data collected by the data logger device is subjected to statistical analysis, an abnormality that is caused by complex factors can automatically and easily be predicted and thus downtime in a machine tool can be reduced. Besides, calculation costs can be reduced by limitation of timing for the learning to the occasions of the occurrence of the abnormalities. Furthermore, signs of important abnormalities can be promptly identified by the notification of the ranking of the abnormalities that may occur.

BRIEF DESCRIPTION OF THE DRAWINGS

The above-mentioned and other objects and features of the invention will become apparent from the following description on the embodiment with reference to the accompanying drawings, in which:

FIG. 3B is a diagram (2) that illustrates the processing which is carried out by the analysis unit according to the embodiment of the invention;

DETAILED DESCRIPTION OF THE PREFERRED EMBODIMENT

Hereinbelow, an embodiment of the invention will be described in conjunction with the drawings.

Figure 1:
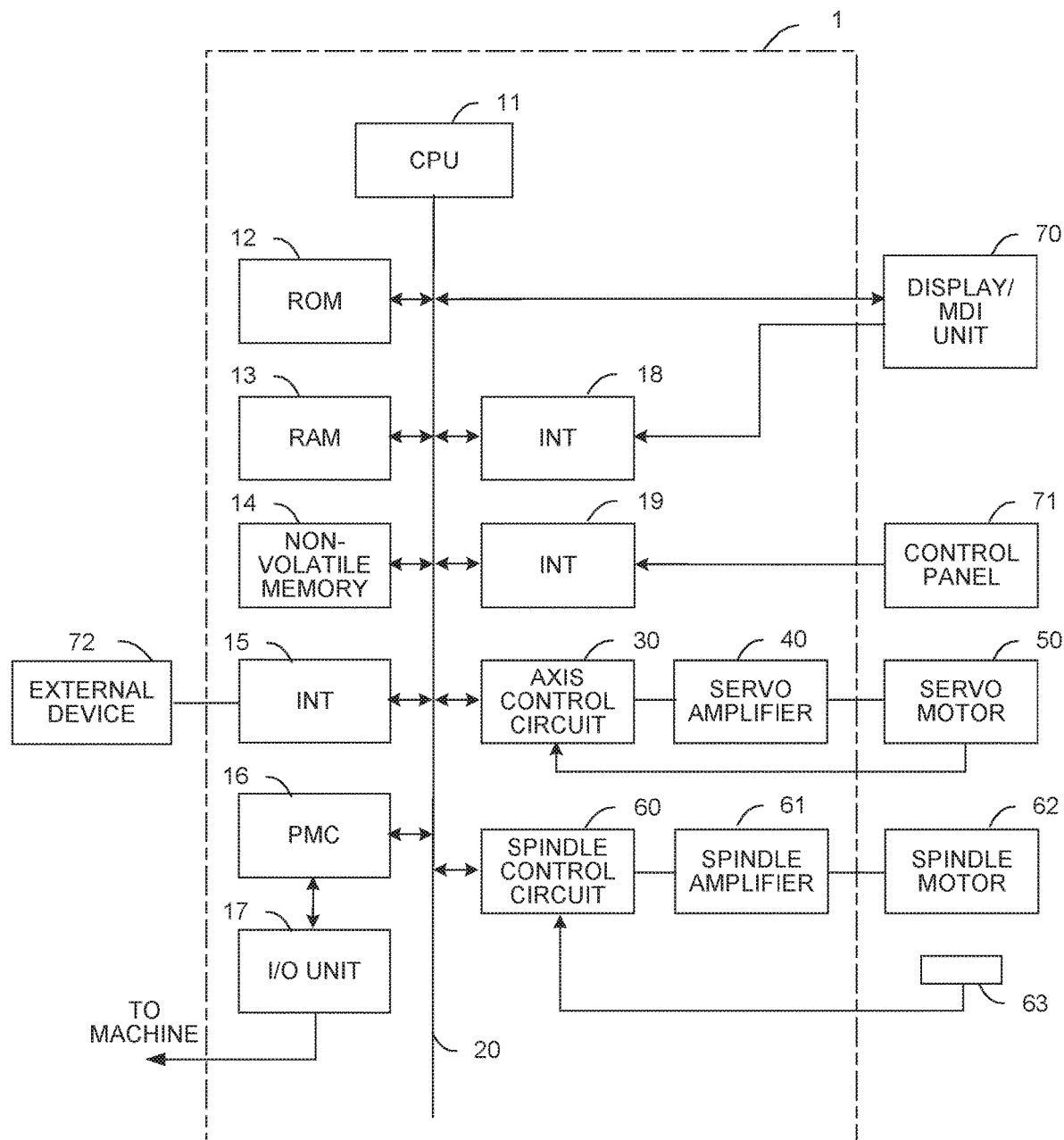
FIG. 1 is a hardware configuration diagram that illustrates principal parts of a conventional numerical controller.

FIG. 1 is a hardware configuration diagram that illustrates principal parts of a conventional numerical controller and a machine tool that is driven and controlled by the numerical controller. A CPU 11 provided in a numerical controller 1 is a processor that generally controls the numerical controller 1. The CPU 11 reads out system programs, stored in a ROM 12, via a bus 20 and controls the whole numerical controller 1 in accordance with the system programs. Temporary calculation data, display data, various types of data inputted by an operator through a display/MDI unit 70 that will be described later, and the like are stored in a RAM 13.

A non-volatile memory 14 is configured as a memory which is backed up by a battery not illustrated, for instance, so that stored status may be held even when the numerical controller 1 is powered off. Machining programs read in through an interface 15 and machining programs inputted through the display/MDI unit 70 that will be described later are stored in the non-volatile memory 14. Operation processing programs for machining programs and the like that are used for operating the machining programs are further stored in the non-volatile memory 14 and are deployed in the RAM 13 for execution. Various system programs for carrying out processing in an edit mode required for preparation and editing of the machining programs and the like have been written in advance into the ROM 12.

The interface 15 is intended to provide connection between the numerical controller 1 and an external device 72 such as an adapter. From a side of the external device 72, the machining programs, various parameters, and the like are read in. The machining programs edited in the numerical controller 1 can be stored in external storage means through the external device 72. A programmable machine controller (PMC) 16 outputs signals to and exercises control over peripheral devices (actuators such as robot hand for replacement of tools, for instance) for the machine tool through an I/O unit 17 in pursuance of sequence programs stored in the numerical controller 1. Besides, the PMC 16 receives signals from switches in a control panel provided on a main unit of the machine tool, or the like, carries out necessary processing for the signals, and thereafter delivers the signals to the CPU 11.

The display/MDI unit 70 is a manual data input device including a display, a key board, and the like. An interface 18 receives instructions and data from the keyboard of the display/MDI unit 70 and delivers the instructions and the data to the CPU 11. An interface 19 is connected to the control panel 71 that includes a manual pulse generator and the like.

Axis control circuits 30 for controlling axes provided in the machine tool receive travel distance instructions for the axes from the CPU 11 and output instructions for the axes to servo amplifiers 40. The servo amplifiers 40 receive the instructions and drive servo motors 50 that move the axes provided in the machine tool. The servo motors 50 for the axes house position/speed detectors, feed back position/speed feedback signals from the position/speed detectors to the axis control circuits 30, and carry out feedback control of positions/speeds.

Though the axis control circuits 30, the servo amplifiers 40, and the servo motors 50 are respectively illustrated so as to be single in the hardware configuration diagram of FIG. 1, a number of those elements that are actually provided is equal to a number of the axes provided in the machine tool.

A spindle control circuit 60 receives spindle rotation instructions for the machine tool and outputs spindle speed signals to a spindle amplifier 61. The spindle amplifier 61 receives the spindle speed signals, rotates a spindle motor 62 of the machine tool at a rotation speed based on the instructions, and thereby drives tools.

A position coder 63 is coupled to the spindle motor 62 and outputs return pulses in synchronization with rotation of the spindle. The return pulses are read by the CPU 11.

Figure 2:
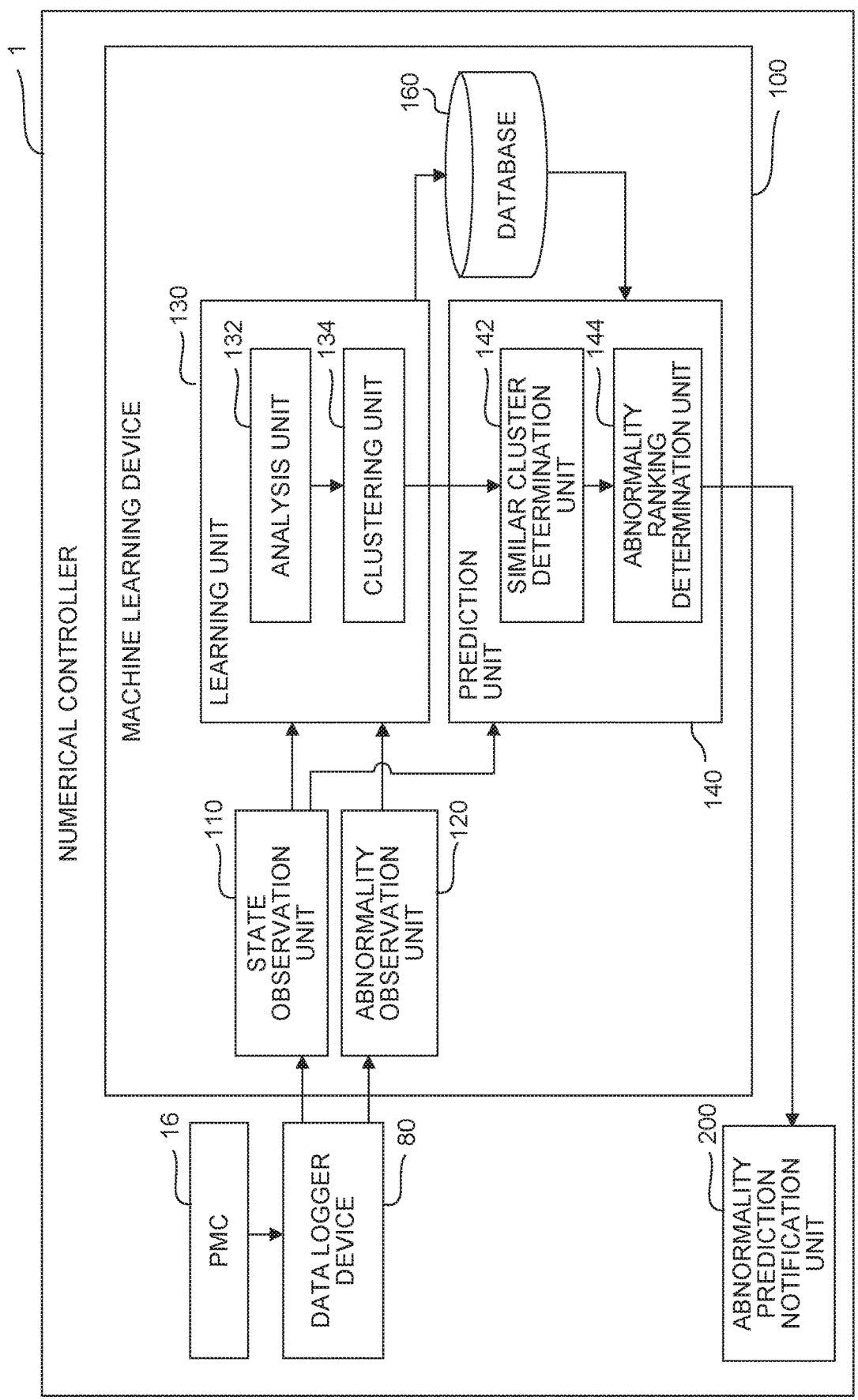
FIG. 2 is a schematic functional block diagram that illustrates a numerical controller according to an embodiment of the invention.

FIG. 2 illustrates a schematic functional configuration diagram of a numerical controller according to an embodiment of the invention.

As illustrated in FIG. 2, the numerical controller 1 according to the embodiment includes a data logger device 80, a machine learning device 100, and an abnormality prediction notification unit 200.

The data logger device 80 is capable of receiving data (such as motor load) acquired from the numerical controller 1 and devices provided in units in the machine tool via the PMC 16 provided in the numerical controller 1 and signals from sensors and recording the data and the signals as time-series data. A publicly known conventional data logger device may be used as the data logger device 80.

The machine learning device 100 provided in the numerical controller 1 according to the embodiment includes a state observation unit 110, an abnormality observation unit 120, a learning unit 130, a prediction unit 140, and a database 160.

The state observation unit 110 periodically collects the time-series data, recorded by the data logger device 80, as input data. The time-series data that is recorded by the data logger device 80 includes operation modes of the numerical controller 1, instructions being executed, and the like.

The abnormality observation unit 120 observes an abnormality (normally announced with an alert or the like) detected by the numerical controller 1 and acquires abnormality information including a type and start time of the abnormality, ending time when the abnormality is resolved, and the like.

The learning unit 130 conducts machine learning based on the input data acquired by the state observation unit 110 and the abnormality information acquired by the abnormality observation unit 120 and stores results of the learning in the database 160. The learning unit 130 includes an analysis unit 132 and a clustering unit 134 as functional means for conducting the machine learning.

Figure 3A:
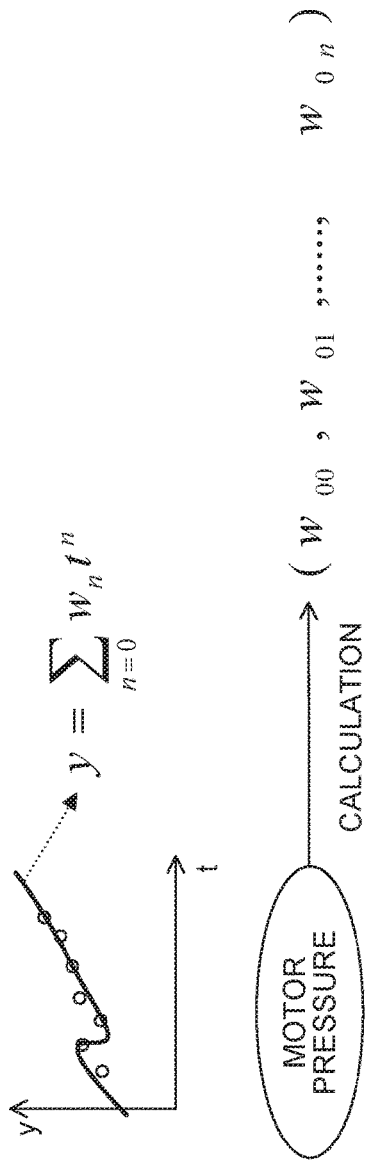
FIG. 3A is a diagram (1) that illustrates processing which is carried out by an analysis unit according to the embodiment of the invention.
Figure 4:
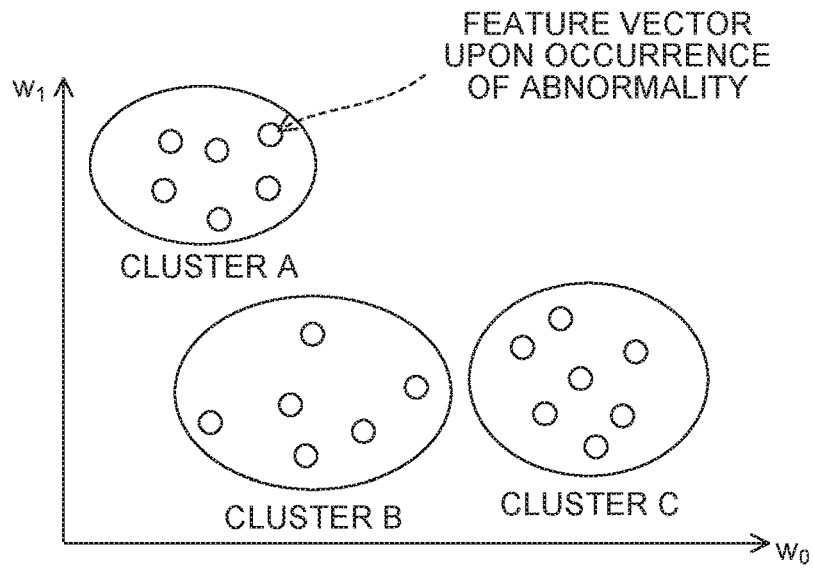
FIG. 4 is a diagram that illustrates processing which is carried out by a clustering unit according to the embodiment of the invention.

FIGS. 3A, 3B, and 4 are diagrams illustrating a sequence of the machine learning that is conducted by the learning unit 130.

The learning unit 130 temporarily stores the input data, acquired by the state observation unit 110 for specified periods, in a first memory buffer provided in the machine learning device 100 and not illustrated. The input data includes a plurality of types of time-series data such as motor pressure, motor position, and motor speed. When the abnormality observation unit 120 acquires the abnormality information indicating occurrence of an abnormality, the learning unit 130 instructs the analysis unit 132 to use a method of least squares, a neural network, or the like to find a nonlinear polynomial that approximately represents a relationship between time (t) and values of each of the plurality of types of time-series data included in the input data for the specified periods stored in the first memory buffer ((i) and (ii) of FIG. 3A). In case where the object data represents 0/1 values such as bit signals, a Bernoulli distribution ($p(x=1)=\mu^x(1-\mu)^{1-x}$) or the like may be used in place of approximation with use of the nonlinear polynomial, which cannot be carried out. Subsequently, the learning unit 130 generates a feature vector into which coefficients in the approximate polynomials on the plurality of types of time-series data found by the analysis unit 132 are connected ((iii) in FIG. 3B), associates the generated feature vector with the abnormality information (the type, start time, and ending time of the abnormality), and stores those in the database 160 ((iv) in FIG. 3B).

When a given amount of sets of the feature vectors and the abnormality information are stored in the database 160, the learning unit 130 instructs the clustering unit 134 to carry out clustering and classification of all the feature vectors, stored in the database 160, based on K-means clustering, a mixture Gaussian distribution, or the like and stores results of the classification in the database 160. FIG. 4 illustrates an example of the clustering, by the clustering unit 134, of the feature vectors on occasions of occurrence of abnormalities. (Though FIG. 4 is illustrated on an assumption that the feature vectors are two-dimensional, to ease viewing, the feature vectors may actually be expressed as vectors of higher dimensions.) In each cluster illustrated in FIG. 4, only the feature vectors associated with occurrence of one type of abnormality are not necessarily included but the feature vectors associated with occurrence of a plurality of types of abnormality may be included. Accordingly, the feature vectors with similar tendencies of occurrence of the abnormalities may be included in each cluster because the feature vectors in similar situations in terms of the time-series data observed by the data logger device 80 are included in each cluster.

The prediction unit 140 is functional means that predicts occurrence of an abnormality based on the input data acquired by the state observation unit 110 and the learning results (results of the clustering of the feature vectors) stored in the database 160 by the learning unit 130. The prediction unit 140 includes a similar cluster determination unit 142 and an abnormality ranking determination unit 144 as functional means for predicting an abnormality.

Figure 5:
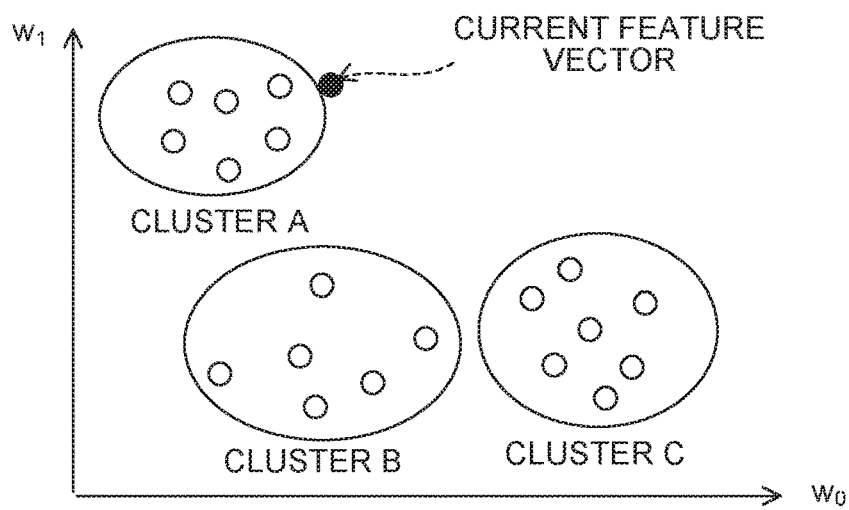
FIG. 5 is a diagram that illustrates processing which is carried out by a similar cluster determination unit according to the embodiment of the invention.
Figure 6:
FIG. 6 is a diagram that illustrates operation of a data logger device.
Figure 7:
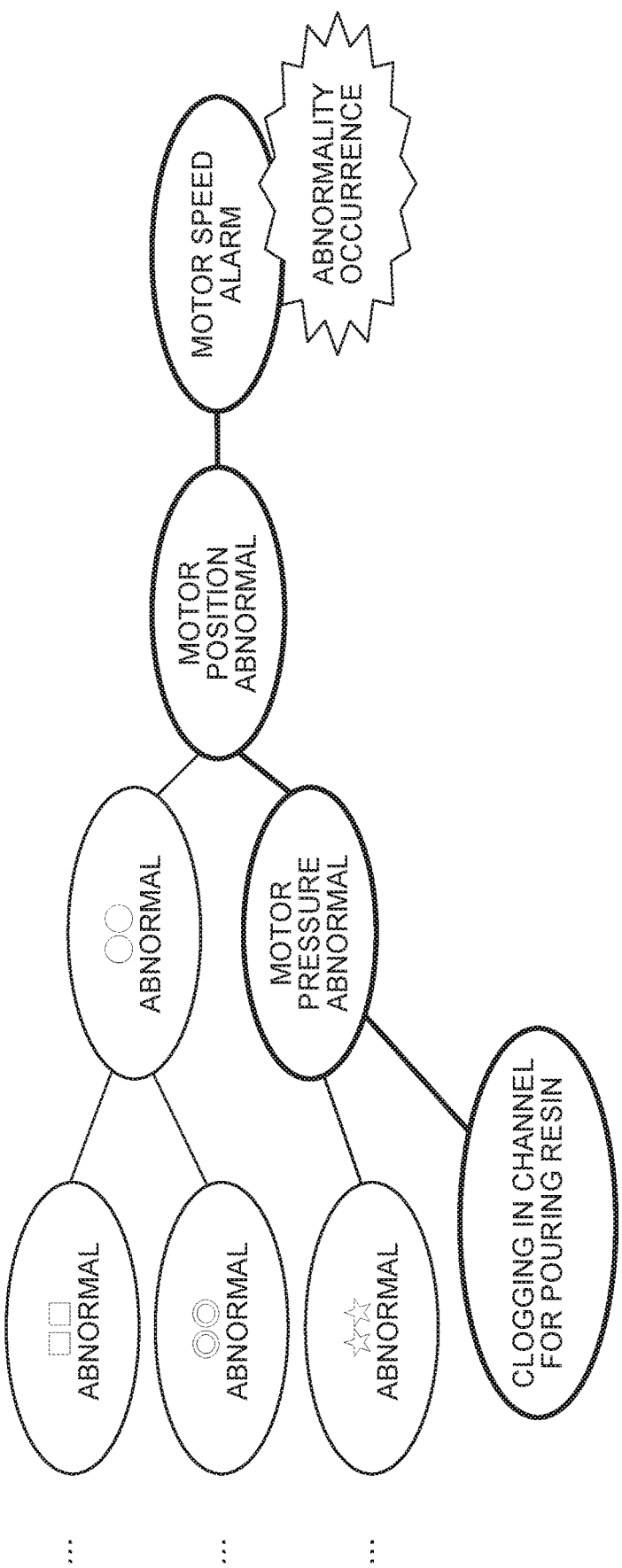
FIG. 7 is a diagram that illustrates a problem on abnormality analysis in a prior art technique.

The prediction unit 140 temporarily stores the input data, acquired by the state observation unit 110 for the specified periods, in a second memory buffer provided in the machine learning device 100 and not illustrated. As with the analysis unit 132, the prediction unit 140 generates a feature vector, based on the input data for the specified periods stored in the second memory buffer, for the similar cluster determination unit 142 every specified period. As illustrated in FIG. 5, the similar cluster determination unit 142 determines a cluster that is the most approximate to the current generated feature vector by comparison of the current feature vector with the results of the clustering that are stored in the database 160. For determination of the cluster that is the most approximate to the current feature vector, distances from center values of the clusters to the current feature vector may be compared and the cluster whose center value is the most approximate to the current feature vector may be selected, for instance, or another statistical technique may be used. In case where the distances from all the clusters are equal to or greater than a predetermined specified threshold, the similar cluster determination unit 142 may determine that there are no clusters which are approximate to the current feature vector. Such determination means that no abnormality is likely to occur in a current situation.

Upon determination of the cluster that is the most approximate to the current feature vector, the prediction unit 140 instructs the abnormality ranking determination unit 144 to produce abnormality ranking in the cluster that is the most approximate to the current feature vector. The abnormality ranking determination unit 144 refers to the database 160 and, based on types, start time, and ending time of abnormalities associated with feature vectors in the cluster that is the most approximate to the current feature vector, carries out scoring on the types of the abnormalities with use of Expression 1 below or the like. As importance in Expression 1, a value from 0 to 1 may be set in accordance with, for example, urgency on an occasion of occurrence of an abnormality, corresponding to the type of the abnormality. For instance, the value of 1 may be set for important abnormalities such as machine alarm and servo alarm and the value smaller than 1 may be set for other abnormalities. Expression 1 is an example of the scoring and may be modified in design within a scope that is thought to be appropriate as a score of abnormality. For instance, the ranking may be calculated with weighting on an important term between a number of occurrences of the abnormality and duration of the occurrences.

Rank of abnormality type in cluster=number of occurrences of abnormality type in cluster×(ending time of abnormality−start time of abnormality)×importance [Expression 1]

Upon completion of the scoring on the types of abnormalities in the cluster that is the most approximate to the current feature vector, the abnormality ranking determination unit 144 produces the ranking of the abnormality types in descending order of the scores and outputs the ranking.

The abnormality prediction notification unit 200 controls the display/MDI unit 70 of the numerical controller 1 and the like and thereby notifies a user of the ranking of the abnormality types outputted from the abnormality ranking determination unit 144. The abnormality prediction notification unit 200 may make notification of the abnormality in first place of the ranking of the abnormality types or may make notification of a specified number of abnormality types in higher positions in the ranking. Such notification makes it possible for the user to perceive higher possibilities of occurrence of the abnormalities of the types in higher positions in the ranking and thus assists in determination in subsequent operation and inspection of the machine by the user. The abnormality prediction notification unit 200 may omit abnormalities of which the scores of occurrence have not reached a predetermined threshold, from objects for the notification.

Though the embodiment of the invention has been described above, the invention is not limited to an example of the embodiment described above and can be embodied in various manners with appropriate modifications.

For instance, a configuration in which the machine learning device 100 includes both the learning unit 130 and the prediction unit 140 has been shown in the embodiment. Provided that sufficient learning has been carried out by the machine learning device 100 including the learning unit 130 and that a specified or larger amount of the feature vectors and the results of the clustering of the feature vectors have been accumulated in the database 160, however, the learning by the learning unit 130 in the machine learning device 100 may be suspended (elements corresponding to the learning unit 130 may be omitted) and the prediction unit 140 may only predict occurrence of abnormality in accordance with input from the data logger device 80.

By contrast, the machine learning device 100 may be configured so as not to make any prediction (elements corresponding to the prediction unit 140 may be omitted) and so as to carry out only the learning. The results of the learning may be accumulated by repetition of experiments with use of the numerical controller 1 with such configurations and accumulated data may be copied into the database 160 of the machine learning device integrated in the numerical controller 1 that is shipped as a product.

The machine learning device 100 and the data logger device 80 do not have to be built in the numerical controller 1 and may be configured so as to be connected to the numerical controller 1 outside the numerical controller 1. The machine learning device 100 may independently be operated by being separated from the numerical controller 1 and being connected to another numerical controller, for instance, as appropriate.

Though the embodiment of the invention has been described above, the invention is not limited to the example of the embodiment described above and can be embodied in other manners with appropriate modifications.

The invention claimed is:

1. A numerical controller configured to control a machine, the numerical controller comprising a processor configured to:
   acquire information, relating to operation of the machine, as time-series data,
   conduct machine learning of trends in operation of the machine on occasions of occurrence of abnormalities in the machine, based on the time-series data, acquire the time-series data as input data,
   acquire abnormality information relating to the abnormalities which occur in the machine,
   conduct the machine learning of the trends in the operation of the machine on the occasions of the occurrence of the abnormalities, based on the input data and the abnormality information,
   store results of the machine learning in a database, calculate approximate expressions for the time-series data included in the input data,
   generate a feature vector based on the calculated approximate expressions,
   store the generated feature vector, associated with the abnormality information, in the database,
   carry out clustering of the feature vector, and
   store results of the clustering in the database, wherein
   the feature vector comprises at least machine operation data and the time-series data,
   the input data comprises at least one of motor pressure data, motor position data, or motor speed data,
   when the clustering of the feature vector is carried out, the processor is configured to
      compare distances from center values of a plurality of clusters to a current feature vector,
      select the cluster whose center value is the most approximate to the current feature vector, and
      in response to the distances from the center values of all the plurality of clusters being equal to or greater than a predetermined threshold, determine that there are no clusters approximate to the current feature vector,
   the processor is configured to refer to the database and, based on types, start time, and ending time of abnormalities associated with feature vectors in the cluster that is the most approximate to the current feature vector, calculate scores of the types of the abnormalities based on the following expression:

Rank of abnormality type in cluster=number of occurrences of abnormality type in cluster×(ending time of abnormality−start time of abnormality)×importance, where the importance is a value from 0 to 1, and is set in accordance with urgency on an occasion of occurrence of an abnormality, corresponding to the type of the abnormality, and
      the processor is configured to produce ranking information in a descending order of the scores and output the ranking information.

2. A numerical controller configured to predict an abnormality which will occur in a machine to be controlled, the numerical controller comprising a processor configured to:
   acquire information, relating to operation of the machine, as time-series data,
   predict occurrence of the abnormality in the machine based on the time-series data,
   output prediction results on the occurrence of the abnormality in the machine, store results of machine learning of trends in the operation of the machine on occasions of occurrence of abnormalities in a database,
   acquire the time-series data as input data,
   predict the occurrence of the abnormality in the machine based on the input data and the results of the machine learning that are stored in the database, wherein, in the database,
      feature vectors representing the trends in the operation of the machine on the occasions of the occurrence of the abnormalities in the machine and abnormality information relating to the abnormalities are stored in association with each other, and
      results of clustering of the feature vectors into a plurality of clusters are stored, calculate approximate expressions for the time-series data included in the input data, generate a feature vector based on the calculated approximate expressions,
   determine which cluster among the plurality of clusters stored in the database is an approximation to the generated feature vector,
   produce ranking information on abnormalities associated with feature vectors belonging to the cluster determined as the approximation to the feature vector, and
   output the produced ranking information as prediction results on a duration of the occurrence of the abnormality in the machine, wherein
   the feature vector comprises at least machine operation data and the time-series data,
   the input data comprises at least two of motor pressure data, motor position data, or motor speed data,
   the processor is configured to refer to the database and, based on types, start time, and ending time of abnormalities associated with the feature vectors in the cluster that is the most approximate to a current feature vector, calculate scores of the types of the abnormalities based on the following expression:

Rank of abnormality type in cluster=number of occurrences of abnormality type in cluster×(ending time of abnormality−start time of abnormality)×importance, where the importance is a value from 0 to 1, and is set in accordance with urgency on an occasion of occurrence of an abnormality, corresponding to the type of the abnormality, and
      the processor is configured to produce the ranking information in a descending order of the scores and output the ranking information.

3. The numerical controller according to claim 2, wherein when the clustering of the feature vectors is carried out, the processor is configured to
compare distances from center values of the plurality of clusters to the current feature vector,
select the cluster whose center value is the most approximate to the current feature vector, and
in response to the distances from the center values of all the plurality of clusters being equal to or greater than a predetermined threshold, determine that there are no clusters approximate to the current feature vector.

4. A machine learning device configured to conduct machine learning of trends in operation of a machine on occasions of occurrence of abnormalities in the machine, based on time-series data representing information relating to the operation of the machine and acquired by a numerical controller which controls the machine, the machine learning device comprising a processor configured to:
acquire the time-series data as input data,
acquire abnormality information relating to the abnormalities which occur in the machine,
conduct the machine learning of the trends in the operation of the machine on the occasions of the occurrence of the abnormalities, based on the input data and the abnormality information,
store results of the machine learning in a database; calculate approximate expressions for the time-series data included in the input data,
generate a feature vector based on the calculated approximate expressions,
store the generated feature vector, associated with the abnormality information, in the database,
carry out clustering of the feature vector, and
store results of the clustering in the database, wherein
the feature vector comprises at least machine operation data and the time-series data,
the input data comprises motor pressure data, motor position data, and motor speed data,
when the clustering of the feature vector is carried out, the processor is configured to
compare distances from center values of a plurality of clusters to a current feature vector,
select the cluster whose center value is the most approximate to the current feature vector, and
in response to the distances from the center values of all the plurality of clusters being equal to or greater than a predetermined threshold, determine that there are no clusters approximate to the current feature vector,
the processor is configured to refer to the database and, based on types, start time, and ending time of abnormalities associated with feature vectors in the cluster that is the most approximate to the current feature vector, calculate scores of the types of the abnormalities based on the following expression:

Rank of abnormality type in cluster=number of occurrences of abnormality type in cluster× (ending time of abnormality−start time of abnormality)×importance, where the importance is a value from 0 to 1, and is set in accordance with urgency on an occasion of occurrence of an abnormality, corresponding to the type of the abnormality, and
the processor is configured to produce ranking information in a descending order of the scores and output the ranking information.

5. A machine learning device configured to predict an abnormality which will occur in a machine controlled by a numerical controller, based on time-series data acquired by the numerical controller and representing information relating to operation of the machine, the machine learning device comprising a processor configured to:
store results of machine learning of trends in the operation of the machine on occasions of occurrence of abnormalities in a database,
acquire the time-series data as input data,
predict occurrence of the abnormality in the machine based on the input data and the results of the machine learning that are stored in the database, wherein, in the database,
feature vectors representing the trends in the operation of the machine on the occasions of the occurrence of the abnormalities in the machine and abnormality information relating to the abnormalities are stored in association with each other, and
results of clustering of the feature vectors into a plurality of clusters are stored, calculate approximate expressions for the time-series data included in the input data,
generate a feature vector based on the calculated approximate expressions,
determine which cluster among the plurality of clusters stored in the database is an approximation to the generated feature vector,
produce ranking information on abnormalities associated with feature vectors belonging to the cluster determined as the approximation to the feature vector, and
output the produced ranking information as prediction results on a duration of the occurrence of the abnormality in the machine, wherein
the feature vector comprises at least machine operation data and the time-series data, and
the input data comprises at least one of motor pressure data, motor position data, or motor speed data,
the processor is configured to refer to the database and, based on types, start time, and ending time of abnormalities associated with the feature vectors in the cluster that is the most approximate to a current feature vector, calculate scores of the types of the abnormalities based on the following expression:

Rank of abnormality type in cluster=number of occurrences of abnormality type in cluster× (ending time of abnormality−start time of abnormality)×importance, where the importance is a value from 0 to 1, and is set in accordance with urgency on an occasion of occurrence of an abnormality, corresponding to the type of the abnormality, and
the processor is configured to produce the ranking information in a descending order of the scores and output the ranking information.

6. The machine learning device according to claim 5, wherein when the clustering of the feature vectors is carried out, the processor is configured to
compare distances from center values of the plurality of clusters to the current feature vector,
select the cluster whose center value is the most approximate to the current feature vector, and
in response to the distances from the center values of all the plurality of clusters being equal to or greater than a predetermined threshold, determine that there are no clusters approximate to the current feature vector.

* * * * *